United States Patent
Martin et al.

(10) Patent No.: US 7,510,653 B2
(45) Date of Patent: Mar. 31, 2009

(54) FILTER ASSEMBLY WITH A WEAK BASE SLOW RELEASE MECHANISM

(75) Inventors: Harold R. Martin, Cookeville, TN (US); Wilson Lee Currier, Cookeville, TN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 148 days.

(21) Appl. No.: 11/468,818

(22) Filed: Aug. 31, 2006

(65) Prior Publication Data

US 2008/0053919 A1    Mar. 6, 2008

(51) Int. Cl.
    *B01D 27/14* (2006.01)
(52) U.S. Cl. .................................... 210/203; 210/501
(58) Field of Classification Search ................ 210/663, 210/690, 752, 790, 805, 199, 198.1, 254, 210/284, 434, 501, 502.1, 206, DIG. 13, 210/200, 203, 505; 123/196 A
    See application file for complete search history.

(56) References Cited

U.S. PATENT DOCUMENTS

| | | | |
|---|---|---|---|
| 4,334,994 A * | 6/1982 | Jensen | 210/343 |
| 4,906,389 A * | 3/1990 | Brownawell et al. | 210/501 |
| 5,069,799 A * | 12/1991 | Brownawell et al. | 210/749 |
| 5,209,839 A | 5/1993 | Shaub et al. | |
| 5,225,081 A | 7/1993 | Brownawell | |
| 5,478,463 A | 12/1995 | Brownawell et al. | |
| 5,695,637 A | 12/1997 | Jiang et al. | |
| 5,906,736 A | 5/1999 | Bounnakhom et al. | |
| 6,835,218 B1 | 12/2004 | Drozd et al. | |
| 2005/0019236 A1 | 1/2005 | Martin et al. | |
| 2005/0167350 A1 | 8/2005 | Herman et al. | |
| 2005/0167351 A1 | 8/2005 | Herman et al. | |

FOREIGN PATENT DOCUMENTS

| | | |
|---|---|---|
| EP | 0 275 148 | 7/1988 |
| EP | 0 416 906 | 3/1991 |
| WO | WO 93/00416 | 1/1993 |
| WO | WO 94/24237 | 10/1994 |

* cited by examiner

*Primary Examiner*—Matthew O Savage
*Assistant Examiner*—Lucas Stelling
(74) *Attorney, Agent, or Firm*—Hamre, Schumann, Mueller & Larson, P.C.

(57) ABSTRACT

A filter assembly is provided that includes an immobilized base material in combination with a slow release mechanism for introducing an additive base material into a lubrication fluid flowing through the filter assembly. The introduced base material is a weaker base material than the base material of the immobilized base material. The combination of the immobilized base material and the additive base material provides a system that would work to neutralize acids for all lube formulations commonly used in the field. As a result, oil drain intervals can be extended.

21 Claims, 3 Drawing Sheets

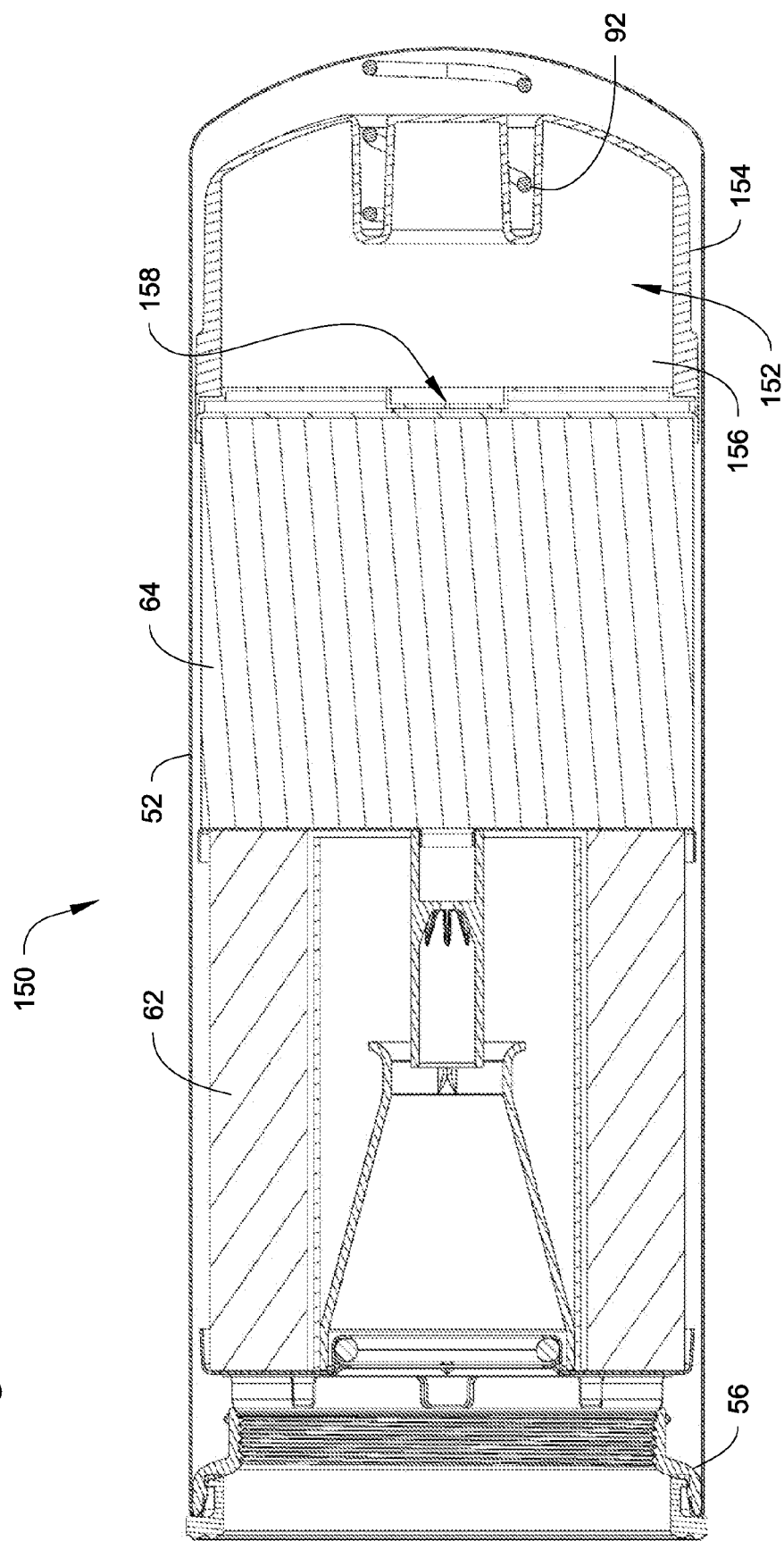

FILTER ASSEMBLY WITH A WEAK BASE SLOW RELEASE MECHANISM

FIELD

A filter assembly for internal combustion engines, including gasoline and diesel engines such as those in automobiles, trucks, heavy equipment, and the like, which require fluid filtration, particularly lubrication oil filtration. More particularly, a filter assembly is provided with an immobilized base material and a mechanism to introduce a weaker base material into the oil to extend oil drain intervals.

BACKGROUND

Internal combustion engines are still the predominant means for propelling motorized vehicles. They are proven to offer many advantages over alternative mechanisms, among these being cost and convenience. Such engines require lubrication, usually employing a circulating lubricant such as oil. Filter assemblies are commonly used to filter the oil to remove contaminants, thereby protecting a combustion engine and preventing damage to the engine and its components lubricated by the oil.

A by-product of combustion is the generation of acids in the ring zone of the engine. Acids can degrade the quality of the oil and shorten oil drain intervals, and if the oil is not changed, can reduce the intended effectiveness of the oil thereby leading to engine damage or failure.

The concept of immobilizing a strong base in a filter assembly and using the strong base to neutralize engine generated acids has been known since the early 1900's. The intent of this known technology is to extend oil drain intervals without changing oil additive package chemistry. It is believed that this technology works in the following manner. As acids are generated in the ring zone of the engine, a weak base will form an acid-base pair with the acid and carry it away from the ring zone to the filter assembly. In the filter assembly, the immobilized strong base will "grab" the acid away from the weak base forming an acid-base pair that is trapped by the immobilized strong base. The weak base is then free to react with more acids in the ring zone, carrying them back to the immobilized base.

However the immobilized base technology may only work with a very select few weak bases. Therefore, the immobilized base technology alone may not work "across the board" for all ail formulations.

SUMMARY

A filter is provided that includes an immobilized base material in combination with a slow release mechanism for introducing an additive base material into lubrication oil flowing through the filter assembly. The additive base material is a weaker base material than the base material of the immobilized base material. The combination of the immobilized base material and the additive base material provides a system that would work to neutralize acids for all lube formulations commonly used in the field. As a result, oil drain intervals can be extended. The additive base material is chosen based on its synergy with the immobilized strong base and its compatibility with the oil with which it is used. The additive should not change the basic performance criteria of the oil.

The weak base is released in a controlled fashion into the lubrication oil using a slow release mechanism, for example a pressure gradient mechanism or a diffusion mechanism. Also, release of the weak base into the lubrication oil can be delayed until the acid level of the oil has risen to a critical level. Release can be delayed using a soluble, acid sensitive seal on the slow release mechanism. The acid sensitive seal dissolves when the acid level of the oil reaches an appropriate level, thus saving the beneficial weak base chemistry until it is actually needed.

In one embodiment, a filter assembly is provided that comprises a housing defining an interior chamber an including an outlet, and a liquid pathway between the inlet and the outlet for a liquid flowing through the interior chamber. A filter element is disposed within the interior chamber in the liquid pathway between the inlet and the outlet. In addition, a first treatment assembly is disposed within the interior chamber, where the first treatment assembly includes a first base material. A second treatment assembly is disposed within the interior chamber and is configured to introduce an additive into the liquid. The additive comprises a second base material, where the second base material is a weaker base material than the first base material.

In another embodiment, a lubrication filter assembly is provided that comprises a housing defining an interior chamber and including an inlet, an outlet, and a lubrication oil pathway between the inlet and the outlet for a lubrication oil flowing through the interior chamber. A filter element is disposed within the interior chamber in the oil pathway between the inlet and the outlet, where the filter element is configured to filter the lubrication oil. In addition, a first treatment assembly is disposed within the interior chamber, with the first treatment assembly including an immobilized base material. Further, a second treatment assembly is disposed within the interior chamber and is configured to introduce an additive into the lubrication oil. The additive comprises a material that is selected to act as an acid transport to transport acids from an engine to the filter assembly to exchange the acids with the immobilized base material of the first treatment assembly.

In another embodiment, a method of neutralizing acids in lubrication oil of an internal combustion engine is provided. The lubrication oil flows through a lubrication filter assembly having an immobilized base material. The method comprises introducing a base material into the lubrication oil in the lubrication filter assembly, where the base material is a weaker base material than the immobilized base material and is capable of acting as an acid transport to transport acids from the engine to the filter assembly to exchange the acids with the immobilized base material.

BRIEF DESCRIPTION OF THE DRAWINGS

FIG. 3 illustrates another embodiment of a filter assembly incorporating the inventive concepts.

DETAILED DESCRIPTION

Figure 1:
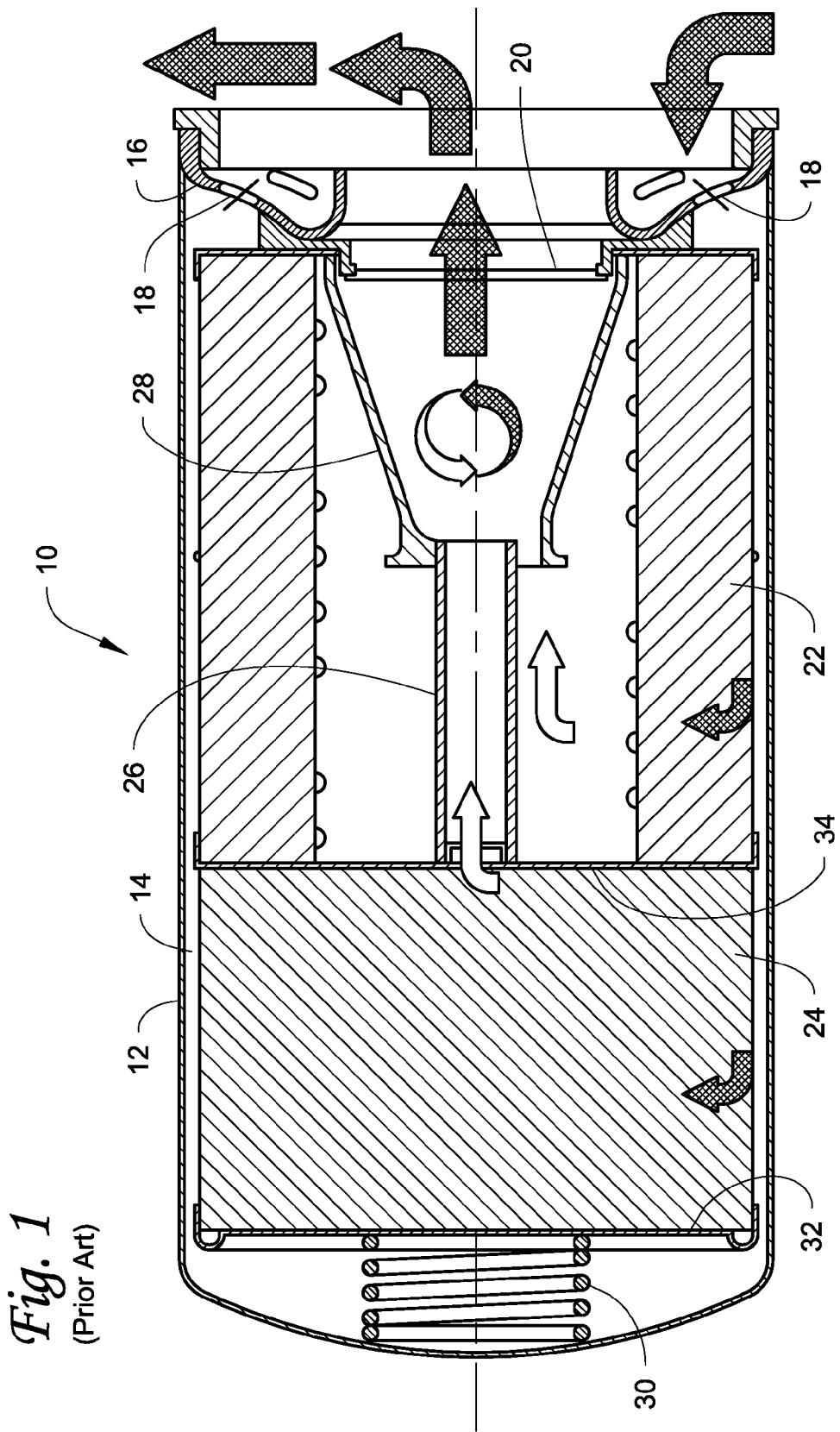
FIG. 1 illustrates a conventional filter assembly.

FIG. 1 is an illustration of a conventional oil filter assembly 10 sold under the trade name Venturi Combination Filter by Cummins Filtration, Inc. of Cookeville, Tenn. The assembly 10 is a spin-on oil filter that includes a housing 12 defining an interior chamber 14 along with a nut plate 16 that is secured to an open end of the housing 12 to close off the chamber 14. The nut plate 16 includes a plurality of circumferentially spaced inlet openings 18 through which lubrication oil enters the interior chamber 14, and a single outlet opening 20 located on the center axis of the filter assembly 10 through which filtered oil exits the filter assembly 10.

A fibrous filter media 22, constituting a primary filter section, is disposed within the chamber 14 for filtering contaminants from the oil. Next to the filter media 22 is an assembly of stacked discs 24 made of, for example, cellulose material, constituting a bypass filter section. As is know, stacked disc media are more efficient at removing contaminants and other substances from the oil. Approximately 85-95% of the oil flows through the filter media 22, and the remainder of the oil flows through the stacked discs 24. The stacked discs 24 are configured to permit the oil to flow through the discs toward a center thereof. The discs 24 are impregnated with strong base material, for example magnesium oxide, calcium oxide, or the like, for trapping acid-base pairs from the oil. The oil treated by the stacked discs 24 then flows through a tube 26 positioned within the filter media 22 and then mixes with the oil filtered by the media 22 within a mixing chamber 28 before the oil exits through the outlet 20. A coil spring 30 within the housing 12 pushes on a plate 32 which forces the stacked discs 24 against a plate 34 which closes the end of the filter media 22.

Figure 2:
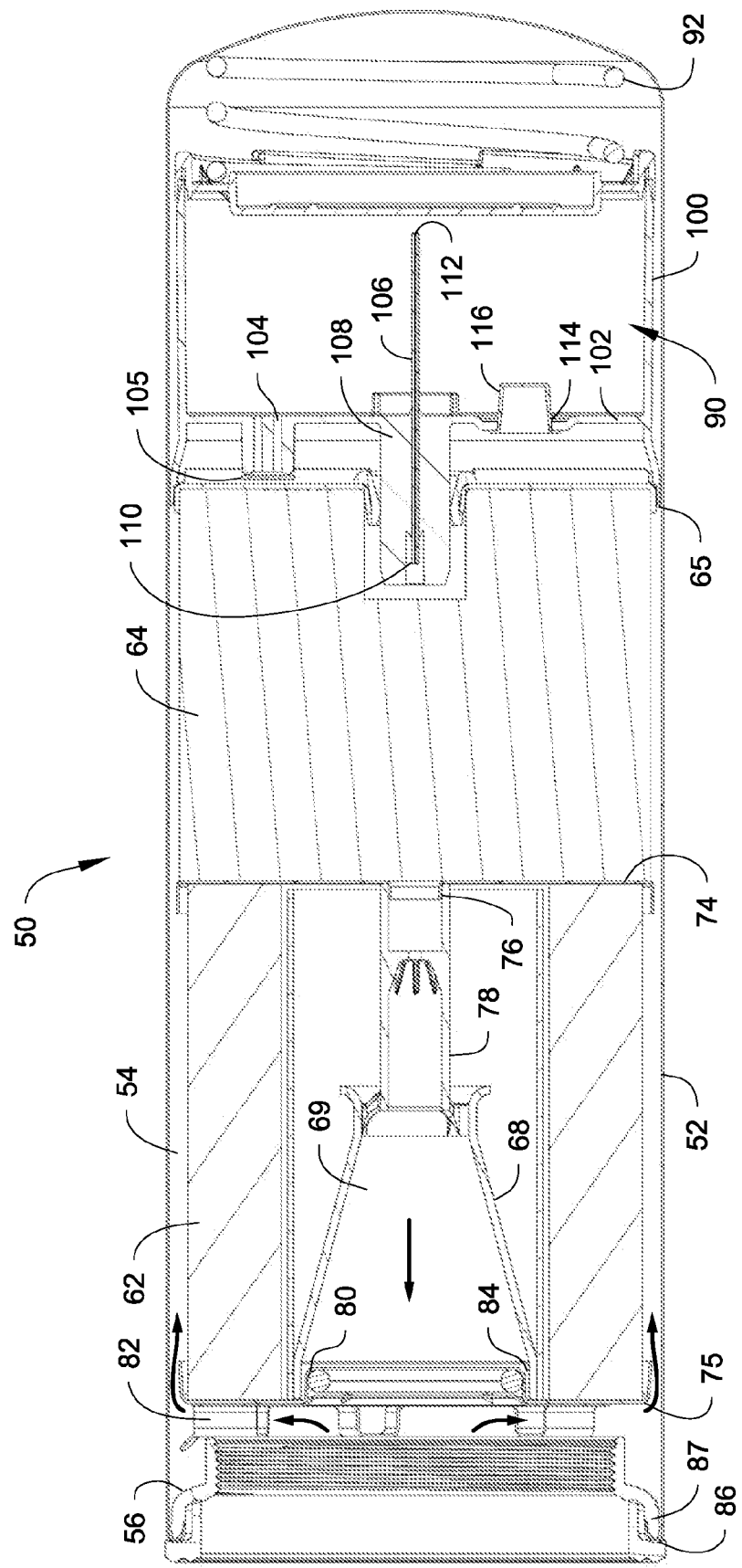
FIG. 2 illustrates a filter assembly incorporating the inventive concepts.

Turning to FIG. 2, a filter assembly 50 is illustrated that is generally similar in construction to the filter assembly disclosed in U.S. Pat. No. 5,906,736 which is incorporated herein by reference in its entirety. The filter assembly 50 is a spin-on oil filter that includes a housing 52 defining an interior chamber 54 along with a nut plate 56 that is secured to an open end of the housing 52. A filter element 62, for example a fibrous filter media, is disposed within the chamber 54 for filtering contaminants from the oil. The filter element 62 includes a hollow interior, a lower endplate 74, and an upper endplate 75. The two endplates are sealed across their corresponding filter element ends in order to prevent fluid flow out through the ends of the filter element 62.

Next to the filter element 62 is a first treatment assembly 64, constituting a bypass filter section, for treating the oil. The first treatment assembly 64 can comprise, for example, an assembly of stacked discs made of, for example, cellulose material. The stacked discs 64 are configured to permit the oil to flow through the assembly toward a center thereof. The first treatment assembly 64 abuts up against the lower endplate 74 and includes an enclosing base endplate 65. The interior of lower endplate 74 is open and formed with a short, cylindrical conduit 76. A tube 78 which fits around conduit 76 provides fluid flow communication from first treatment assembly 64 into a nozzle 68. In the preferred embodiment, the tube 78 is in unitary combination with the nozzle 68, i.e. they are a one-piece combination. It is also envisioned that a separate tube 78 can be used and fitted around conduit 76 and located within the nozzle 68.

The upper endplate 75 is formed with an inner annular lip 80 which provides an anchor for an inner seal 82. The nozzle 68 includes an outwardly flared end 84 that fits around the inner annular lip 82. The nozzle 68 includes an outwardly flared end 84 that fits around the inner annular lip 80. An inside annular surface of the inner seal 82 fits up against a stem of a filter head as described in U.S. Pat. No. 5,906,736. The nut plate 56, which may be stamped, molded, or machined, is internally threaded and is assembled to an externally-threaded portion of the filter head.

The housing 52 is metal and has a substantially cylindrical sidewall which includes a formed upper lip 86 which is shaped with an inverted receiving channel. Tightly and securely anchored into the channel is an annular upper, outer lip 87 of nut plate 56. An outer seal 88 is provided to ensure that there is no leakage through the lip 87/receiving channel interface.

The filter head to which the filter assembly 50 will be secured includes an alternating pattern of bolt holes and fluid inlet apertures. The fluid inlet apertures provide fluid inlets for the fluid to be filtered to flow into the filter head and into the filter assembly. The bolt holes provide a means of mounting the filter head to the vehicle engine. The filter head also includes an open interior to provide a flow path into the vicinity of inner seal 82 where the unfiltered fluid is able to flow in a radially outward direction beneath the lower edge of nut plate 56 as shown by the arrows in FIG. 2. A hollow stem of the filter head that is substantially coaxial with the nozzle 68 creates an exit passageway for the filtered fluid exiting from the filter element 62 and from the first treatment assembly 64.

Further details on the filter assembly's interaction with the filter head and the inlet and outlet flow paths can be found in U.S. Pat. No. 5,906,736. The concepts described herein can be used on other types of oil filters as well. For example, the concepts described herein can be used with the type of filter illustrated in FIG. 1.

The stacked discs 64 can be impregnated with a strong base material where the base is retained in the discs and is not intended to be released into the oil, i.e. the base material is "immobilized". Examples of suitable strong bases include, but are not limited to, magnesium oxide, calcium oxide, barium oxide, calcium carbonate, calcium hydroxide, magnesium carbonate, magnesium hydroxide, sodium aluminate, sodium carbonate, sodium hydroxide, zinc oxide, mixtures thereof, or the like. Magnesium oxide is a particularly preferred strong base. Alternatively, a sacrificial metal, such as zinc, or a sacrificial metal, such as zinc, used in combination with a strong base like zinc oxide, could be used to remove the acids. The strong base is intended to form acid-base pairs with acid in the oil, and trap the acid-base pairs in the discs 64. Any strong base material can be used as long as the base material is capable of performing the function of "grabbing" acid away from a weaker base material and forming acid-base pairs with the acid.

The filter assembly 50 also includes a second treatment assembly 90 disposed within the chamber 54 next to the first treatment assembly 64. The second treatment assembly 90 is configured to introduce an additive, for example a weak base material, into the oil. The assembly 90 preferably comprises a slow release mechanism that controls the rate of introduction of the weak base material into the oil.

The weak base material introduced by the assembly 90 is preferably a weaker base material than the immobilized base material of the first treatment assembly 64. The weak base material that is used should be selected to neutralize acids in the ring zone of the engine that result from combustion, and transport the acids to the first treatment assembly 64 of the filter assembly where the weak base exchanges the acids they have captured with the immobilized base material of the first treatment assembly. Examples of suitable weak base material include, but are not limited to, a magnesium sulfonate, a calcium sulfonate, a calcium phenate, a calcium salicylate, a succinamide compound, mixtures thereof, and the like. Other weak base material could be used, as long as the weak base material that is selected is capable of functioning as an acid transport mechanism, and can exchange transported acids with the base material of the first treatment assembly.

In FIG. 2, approximately 85-95% of the oil flows through the filter media 62, and the remainder of the oil flows through the stacked discs 64. The oil treated by the stacked discs 64 then flows through the tube 78 and then mixes with the oil filtered by the media 62 within a mixing chamber 69 defined by the nozzle 68 before the oil exits through the outlet to be directed to the engine.

A coil spring 92 within the housing 52 pushes against the bottom of the treatment assembly 90 which forces the treatment assembly 90 into engagement with the endplate 65 which forces the discs 64 against the endplate 74. In an alternative, the coil spring 92 could engage against a plate which in turn is engaged with the treatment assembly 90.

As indicated above, the assembly 90 preferably comprises a slow release mechanism that controls the rate of introduction of the weak base material into the oil. In the embodiment illustrated in FIG. 2, the slow release mechanism comprises a pressure gradient mechanism that is configured so that a pressure gradient developed within the filter assembly 50 drives the release of the weaker base material into the oil.

As well known in the type of filter illustrated in FIG. 2, a pressure gradient is developed between an inflow path of the oil to the filter media 62 and the stacked discs 64, and the interior space of the filter media 62 and the stacked discs 64. The pressure gradient is such that a higher pressure exits in the inflow path outside of the media 62 and discs 64 than within the interior of the media 62 and the discs 64. This pressure gradient is used to drive the weak base material into the oil at a controlled rate.

In particular, the pressure gradient mechanism includes an enclosed container 100 that houses the weak base material, which is typically in liquid form. The container 100 includes a lid 102 that closes the top of the container 100. An orifice 104 is formed in the lid 102 and a capillary tube 106 extends upwardly from the base of the container 100 proximate the central axis of the filter assembly 50. The tube 106 extends upwardly beyond the orifice 104. To accommodate this extension, the lid 102 is formed with a protrusion 108 that extends into a centrally hollowed section of the disc stack. The upper end of the tube 106 includes an outlet 110 located within the lower pressure section of the filter assembly, for discharging weak base material into oil flowing through the disc stack. The orifice 104 is positioned so that it is exposed to a higher pressure than the capillary tube outlet 110. The orifice 104 can be positioned at any location on the lid 102 as long as the pressure differential is obtained. The bottom end of the tube 106 includes one or more openings 112 through which the weak base flows into the tube 106, driven by the pressure differential between the orifice 104 and the outlet 110. Based on the pressures generated in the filter assembly, the size of the orifice 104 and capillary tube 106 are chosen so as to achieve a desired rate of introduction of the weak base into the oil. A fill opening 114 can be provided in the lid 102 to permit filling and refilling of the container 100. A removable plug 116 is provided to close the opening 114.

To seal the container 100 during manufacture and shipping, and delay the release of the weak base from the container 100 until the acid level of the oil has risen to a critical level, an acid sensitive, soluble seal 105 can be placed on the orifice 104 and/or on the outlet 110. The soluble seal(s) 105 would be made of a material that would dissolve only when the acid level of the oil reaches an appropriate level. Therefore, the beneficial weak base chemistry is saved until it is needed. Preferably the soluble seal is composed of a material soluble in organic solvents, for example a fuel soluble polymer such as a wax. As an alternative to an acid sensitive seal, a soluble seal material that dissolves upon exposure to the normal operating temperatures of the oil flowing through the filter assembly could be used.

When the seal(s) 105 dissolve, a pressure that is higher than the pressure acting on the capillary tube outlet acts on the orifice 104, which forces the weak base through the opening 112 upward into the tube 106 and through the outlet 110. The weak base mixes with the oil in the stacked discs, and is carried by the oil out of the filter assembly 50 to the engine. The weak base in the oil picks up acids from the engine and carries to acids back to the filter assembly. For the portion of the returned oil that flows through the stacked discs, the strong base of the stacked discs will "grab" the acid away from the weak base and the acid-base pair is trapped by the stacked discs. The freed weak base can then return to the engine to pick up additional acids to carry back to the immobilized base of the stacked discs.

Further details on pressure gradient slow release mechanisms in filter assemblies can be found in U.S. published patent application nos. 2005/0167351 and 2005/0167350, both published on Aug. 4, 2005, which are incorporated herein by reference in their entirety.

FIG. 3 illustrates an alternative embodiment of a filter assembly 150 that is similar to the filter assembly in FIG. 2, except for use of a slow release mechanism 152 that is configured as a diffusion mechanism that diffuses the weak base into the oil. In FIG. 3, features that are similar to features in FIG. 2 are referenced by the same reference numbers.

In particular, the diffusion mechanism includes an enclosed container 154 that houses the weak base material, which is typically in liquid form. The container 154 includes a lid 156 that closes the top of the container 154. One or more orifices 158 are formed in the lid 156, with the orifice(s) positioned at any desired location(s) on the lid 156. The orifice(s) allows the weak base to diffuse therethrough, as shown by the arrow, during use of the filter assembly. The weak base then flows into the stacked discs 64 where it mixes with the oil. The rate of diffusion through the orifice(s) can be controlled by the size of the orifice(s) 158.

As with the slow release mechanism in FIG. 2, an acid sensitive, soluble seal can cover the orifice(s) 158 to delay the release of the weak base from the container 154 until the acid level of the oil has risen to a critical level sufficient to dissolve the seal.

Further details on diffusion mechanisms can be found in U.S. published patent application no. 2005/0019236 which is incorporated herein by reference in its entirety.

As should be apparent from the description above, the combination of the added weak base and the immobilized strong base is effective to neutralize acids in the oil of an internal combustion engine. By introducing a base material into the lubrication oil in the lubrication filter assembly, where the base material is a weaker base material than the immobilized base material and is capable of acting as an acid transport to transport acids from the engine to the filter assembly to exchange the acids with the immobilized base material, the acids in the oil can be neutralized, thereby extending oil drain intervals. The weak base could be introduced into the oil at any location in the lubrication system and still achieve the beneficial results described herein.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A filter assembly, comprising:
a housing defining an interior chamber and including an inlet at a first end of the housing, an outlet, a second end of the housing, and a liquid pathway between the inlet and the outlet for a liquid flowing through the interior chamber;
a filter element disposed within the interior chamber in the liquid pathway between the inlet and the outlet;
a first treatment assembly disposed within the interior chamber, the first treatment assembly including a first base material; and
a second treatment assembly disposed within the interior chamber and configured to introduce an additive into the liquid, the additive comprising a second base material, where the second base material is a weaker base material than the first base material;
the first treatment assembly and the second treatment assembly are positioned between the filter element and the second end of the housing.

2. The filter assembly of claim 1, wherein the first base material is selected from calcium oxide, magnesium oxide, barium oxide, calcium carbonate, calcium hydroxide, magnesium carbonate, magnesium hydroxide, sodium aluminate, sodium carbonate, sodium hydroxide, zinc oxide, and mixtures thereof.

3. The filter assembly of claim 1, wherein the second base material is selected from a magnesium sulfonate, a calcium sulfonate, a calcium phenate, a calcium salicylate, a succinamide compound, and mixtures thereof.

4. The filter assembly of claim 1, wherein the second base material is selected to neutralize acids in a ring zone of an engine and transport the acids to the filter assembly to exchange the acids with the first base material.

5. The filter assembly of claim 1, wherein the first treatment assembly comprises stacked disks impregnated with the first base material.

6. The filter assembly of claim 1, wherein the second treatment assembly comprises a slow release mechanism that controls the rate of introduction of the second base material into the liquid.

7. The filter assembly of claim 6, wherein the slow release mechanism comprises a pressure gradient mechanism that is configured so that a pressure gradient drives the release of the second base material into the liquid.

8. The filter assembly of claim 6, wherein the slow release mechanism comprises a diffusion mechanism that is configured so that the second base material diffuses into the liquid.

9. The filter assembly of claim 6, wherein the slow release mechanism includes an acid sensitive seal that is soluble in the liquid, and the acid sensitive seal dissolves once the liquid reaches a predetermined acid level.

10. The filter assembly of claim 1, wherein the first treatment assembly is positioned between the filter element and the second treatment assembly, and the second treatment assembly is positioned between the first treatment assembly and the second end of the housing.

11. A lubrication filter assembly, comprising:
a housing defining an interior chamber and including an inlet, an outlet, and a lubrication oil pathway between the inlet and the outlet for a lubrication oil flowing through the interior chamber;
a filter element disposed within the interior chamber in the oil pathway between the inlet and the outlet, the filter element configured to filter the lubrication oil;
a first treatment assembly disposed within the interior chamber, the first treatment assembly including an immobilized base material; and
a second treatment assembly disposed within the interior chamber and configured to introduce an additive into the lubrication oil, without the lubrication oil flowing through the second treatment assembly, the additive comprising a material that is selected to act as an acid transport to transport acids from an engine to the filter assembly to exchange the acids with the immobilized base material of the first treatment assembly.

12. The lubrication filter assembly of claim 11, wherein the additive comprises a base material, where the introduced base material is a weaker base material than the immobilized base material of the first treatment assembly.

13. The lubrication filter assembly of claim 11, wherein the immobilized base material is selected from calcium oxide, magnesium oxide, barium oxide, calcium carbonate, calcium hydroxide, magnesium carbonate, magnesium hydroxide, sodium aluminate, sodium carbonate, sodium hydroxide, zinc oxide, and mixtures thereof.

14. The lubrication filter assembly of claim 12, wherein the introduced base material is selected from a magnesium sulfonate, a calcium sulfonate, a calcium phenate, a calcium salicylate, a succinamide compound, and mixtures thereof.

15. The lubrication filter assembly of claim 11 wherein the first treatment assembly comprises stacked disks impregnated with the immobilized base material.

16. The lubrication filter assembly of claim 11, wherein the second treatment assembly comprises a slow release mechanism that controls the rate of introduction of the additive into the lubrication oil.

17. The lubrication filter assembly of claim 16, wherein the slow release mechanism comprises a pressure gradient mechanism that is configured so that a pressure gradient drives the release of the additive into the lubrication oil.

18. The lubrication filter assembly of claim 16, wherein the slow release mechanism comprises a diffusion mechanism that is configured so that the additive diffuses into the lubrication oil.

19. The lubrication filter assembly of claim 16, wherein the slow release mechanism includes an acid sensitive seal that is soluble in the lubrication oil, and the acid sensitive seal dissolves once the lubrication oil reaches a predetermined acid level.

20. The lubrication filter assembly of claim 11, wherein:
the oil pathway includes a first flow path and a second flow path, the volume of oil that is able to flow through the first flow path being greater than the volume of oil that is able to flow through the second flow path;
the filter element is positioned to filter lubrication oil that flows in the first flow path; and
the first treatment assembly is positioned in the second flow path.

21. The lubrication filter assembly of claim 20, wherein the second treatment assembly introduces the additive into lubrication oil in the second flow path.

* * * * *